United States Patent [19]
Preston et al.

[11] Patent Number: 5,542,255
[45] Date of Patent: Aug. 6, 1996

[54] HIGH TEMPERATURE RESISTANT THERMAL INSULATION FOR CRYOGENIC TANKS

[75] Inventors: Duane Preston, New Prague; Thomas K. Drube, Lakeville, both of Minn.

[73] Assignee: Minnesota Valley Engineering, Inc., New Prague, Minn.

[21] Appl. No.: 238,238

[22] Filed: May 4, 1994

[51] Int. Cl.[6] .................................................. F17C 1/00
[52] U.S. Cl. .......................................... 62/45.1; 220/901
[58] Field of Search ............................. 62/45.1; 220/901

[56] References Cited

U.S. PATENT DOCUMENTS

| | | | |
|---|---|---|---|
| 3,118,194 | 1/1964 | Biais | 62/45.1 |
| 3,130,561 | 4/1964 | Hnilicka, Jr. | 62/45.1 |
| 3,139,206 | 6/1964 | Matsch | 62/45.1 |
| 3,425,234 | 2/1969 | Trepaud | 62/45.1 |
| 3,699,696 | 10/1972 | Rhoton | 62/45.1 |

*Primary Examiner*—Ronald C. Capossela
*Attorney, Agent, or Firm*—Rockey, Rifkin and Ryther

[57] ABSTRACT

The invention consists of at least one layer of super insulation surrounding the vessel containing the cryogenic liquid. A thin layer of high temperature insulation surrounds the super insulation. Both layers of insulation are surrounded by an outer jacket.

8 Claims, 1 Drawing Sheet

HIGH TEMPERATURE RESISTANT THERMAL INSULATION FOR CRYOGENIC TANKS

BACKGROUND OF THE INVENTION

The invention relates, generally, to cryogenic liquid tanks and, more particularly, to an improved high temperature insulation for such tanks.

As is well known, cryogenic liquids, such as liquid natural gas (LNG), nitrogen, oxygen, $CO_2$, methane, hydrogen and the like, are liquified gasses at extremely cold temperatures. Special problems are encountered in handling and storing cryogenic liquids because the cryogenic liquids will undergo phase changes at low temperature.

Cryogenic liquids are typically stored in tanks consisting of a vessel containing the liquid and a jacket spaced from and surrounding the vessel where the space between the vessel and jacket is filled with a thermal insulating media and is evacuated. This structure is typical of cryogenic storage tanks including large vertical tanks, small portable tanks and horizontal tanks found on LNG powered vehicles. Moreover, the large vertical storage tanks, which can be 35 feet tall, are supported on legs where industry standards require that the legs be insulated if they are greater than 18 inches high.

These elaborate insulating systems are required for a number of reasons. First, if the tanks are not thermally insulated, heat will be transferred to the cryogenic liquid causing it to vaporize and expand such that it must be vented from the tank resulting in wasted product. Moreover, the venting of the product may cause a hazard because many of these cryogens are extremely flammable. Finally, extremely fast vaporization of the cryogen fluid could cause the storage tank to burst creating a potential fire and explosion hazard.

One commonly used high performance thermal insulation is referred to as "super insulation" and consists of alternating layers of thin aluminum foil and glass fiber insulation. The super insulation is wrapped around the interior vessel and fills the evacuated space. While super insulation minimizes heat leak from the external environment to the cryogen liquid stored in a tank, it can degrade or even melt when subjected to high temperatures such as generated during a fire. This is even more important if the vacuum is lost and the insulation is subjected to a fire condition.

The degradation of the super insulation, resulting from exposure to high temperatures, will result in increased heat transfer to the liquid causing the "boil off" or vaporization of the cryogen liquid stored in the tank and resulting in venting of gas and/or the bursting of the tank or its associated plumbing. As will be apparent, the venting of vapor or the bursting of a tank of a cryogenic fluid like hydrogen in the area of a fire or other intense heat could result in a catastrophe.

While the insulating performance of other media, such as perlite, a granular insulating material, does not degrade when exposed to heat, these other forms of insulation do not have the superior insulating characteristics of super insulation and are not as desirable for thermally insulating cryogenic systems.

Thus, an insulation that has the insulating performance of super insulation that does not degrade when exposed to high temperature is desired.

SUMMARY OF THE INVENTION

The insulation of the invention consists of super insulation located in the evacuated space between the inner vessel and outer jacket combined with a thin layer of high temperature insulation surrounding the super insulation. The combination of super insulation and the high temperature insulation is much more efficient than other forms of insulation such as perlite such that less insulation can be used resulting in a smaller, lighter, thermally insulated high temperature resistent tank. A similar arrangement is used on the legs supporting large vertical tanks where the legs are wrapped in super insulation, the super insulation is wrapped in high temperature insulation and both layers of insulation are protected from weather and mechanical damage by a thin metal outer jacket.

DETAILED DESCRIPTION OF THE INVENTION

Figure 1:
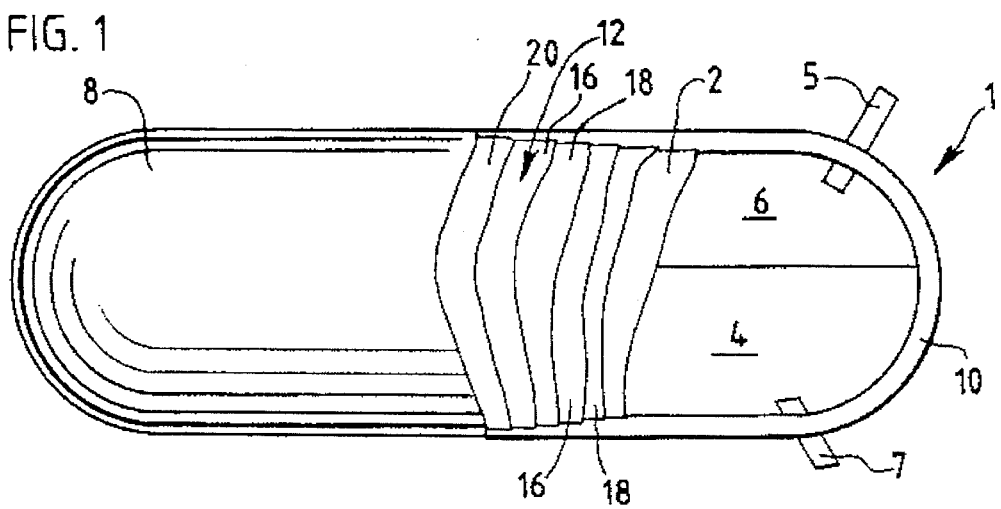
FIG. 1 is a cross sectional view of a cryogenic tank using the insulation of the invention.

Referring more particularly to FIG. 1, a horizontal storage tank 1, typical of those used on LNG powered vehicles, is shown using the insulation arrangement of the invention. While a horizontal, vehicle mounted tank is illustrated it will be appreciated that the insulation of the invention can be used on any thermally insulated tank.

The tank 1 consists of an inner vessel 2 that holds a quantity of liquid cryogen 4. A fill pipe 5 communicates with the inner vessel 2 for delivering cryogen thereto and a delivery pipe 7 also communicates with vessel 2 for delivering cryogen from the vessel to a use device. Suitable valving and economizer circuitry can be provided to control the storage and delivery of the cryogen as will be understood. A ullage or head space 6 is located above the liquid cryogen 4 for retaining a limited amount of vaporized cryogen. It will be understood that some heat leak to the liquid will occur over time resulting in the vaporization of a predictable amount of gas that can be stored in the tank. While some small amount of vaporization is to be expected, the insulation of the invention will prevent the fast vaporization of large quantities of liquid that would otherwise result from the break down of the insulation.

Surrounding inner vessel 2 and spaced therefrom is an outer jacket 8. Jacket 8 is spaced from inner vessel 2 such that an insulating space 10 is located therebetween. Space 10 is evacuated to minimize heat transfer across the space. Moreover, super insulation 12 substantially fills space 10 and surrounds the inner vessel 2. In the preferred embodiment, the super insulation 12 consists of alternating layers, typically on the order of 20 to 40 layers, of aluminum foil 16 and glass fiber insulation 18. Other types of super insulation such as Mylar can be used if desired.

Surrounding the super insulation 12, inside of outer jacket 8, is a layer of high temperature insulation 20. In the preferred embodiment, the high temperature insulation 20 consists of 0.125"–0.375" ceramic fiber although other suitable high temperature insulation such as rock wool can be used. High temperature insulation as used in this invention means any material that insulates against the transfer of heat from the external environment to the super insulation that would otherwise cause the degradation of the super insulation. Ceramic fiber is particularly suited for this application because a relatively light weight, low volume layer provides adequate high temperature insulation and will protect the super insulation to temperatures of approximately 2300° F. It is also suitable for vacuum insulated systems. Thus, the insulation of the invention maintains the high performance thermal insulation of super insulation while providing protection against the degradation of the super insulation due to high temperatures.

Figure 2:
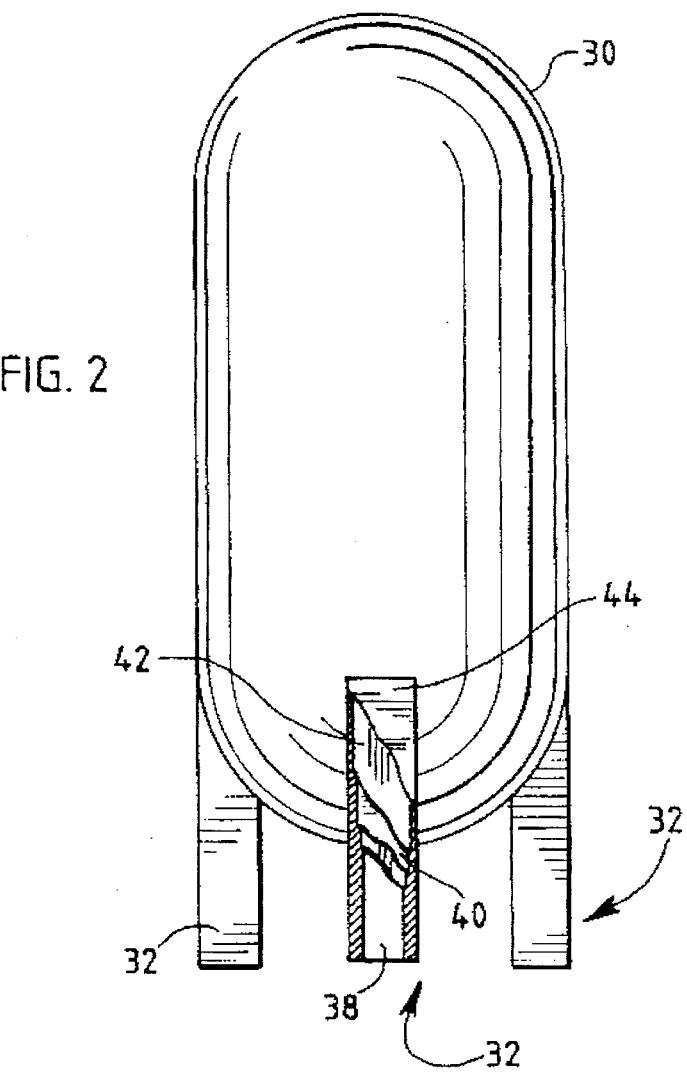
FIG. 2 shows a large vertical tank and support leg in partial cross section using the insulation of the invention.

Referring to FIG. 2, a large vertical storage tank 30 is shown supported on legs 32. Tank 30 is preferably constructed in a similar manner to tank 1 as described with reference to FIG. 1. A typical large vertical storage tank can be 35 feet tall and hold tens of thousands of gallons of cryogen liquid. In applications where the legs 32 are higher than 18 inches, the legs 32 must be thermally insulated to prevent heat leak to the tank and must have a high temperature insulation to prevent their collapse when exposed to high temperature.

The insulation of the invention can be used to provide both thermal and high temperature insulation for the legs. Reference will be made to the detailed construction of only one of the legs, it being understood that all of the support structure for the tank will be similarly insulated. Specifically, the support leg 38 (or any other supporting structure) is wrapped in super insulation 40 as previously described. A layer of high temperature insulation 42 such as the ceramic fiber previously described surrounds the super insulation 40. A metal outer jacket 44 is secured over the high temperature insulation layer 42 to protect the insulation from the elements and mechanical damage. This insulation arrangement thermally insulates the legs and other support structure, is easy to install and is heat resistant and is not easily damaged.

While the invention has been described in some detail with reference to the figures, it will be appreciated that numerous changes in the details and construction of the device can be made without departing from the spirit and scope of the invention.

What is claimed is:

1. A heat resistant thermal insulation for use in cryogenic tanks, comprising:
    a) at least one layer of high performance thermal insulation;
    b) at least one layer of high temperature insulation surrounding the high performance thermal insulation for preventing thermal degradation of the latter to temperatures of up to approximately 2300 degrees Fahrenheit.

2. The insulation according to claim 1, wherein the thermal insulation comprises super insulation.

3. The insulation occurring to claim 1 wherein the high performance thermal insulation consists of alternating layers of aluminum foil and glass fiber insulation.

4. The insulation according to claim 1, wherein the high temperature insulation consists of ceramic fiber.

5. A cryogenic tank, comprising:
    a) a vessel for holding a quantity of cryogenic fluid;
    b) an outer jacket spaced from and surrounding the vessel defining a space therebetween;
    c) at least one layer of high performance thermal insulation surrounding the vessel in said space; and
    d) at least one layer of high temperature insulation surrounding the at least one layer of high performance thermal insulation to prevent degradation of the latter to temperatures up to approximately 2300 degrees Fahrenheit.

6. The cryogenic tank according to claim 5, wherein the thermal insulation comprises super insulation.

7. The cryogenic tank according to claim 6, wherein the super insulation comprises alternating layers of aluminum foil and glass fiber insulation.

8. The cryogenic tank according to claim 5, wherein the high temperature insulation consists of ceramic fiber.

* * * * *